United States Patent [19]
York

[11] Patent Number: 4,918,632
[45] Date of Patent: Apr. 17, 1990

[54] NOTEBOOK MOUNTABLE COMPUTER SYSTEM

[75] Inventor: Dennis C. York, Corvallis, Oreg.

[73] Assignee: Hewlett-Packard Company, Palo Alto, Calif.

[21] Appl. No.: 272,579

[22] Filed: Nov. 17, 1988

[51] Int. Cl.⁴ .......................... G06F 15/02; B42F 3/00
[52] U.S. Cl. ......................................... 364/708; 402/4
[58] Field of Search ............... 364/708, 900 MS File, 364/709.12; 235/1 D; 402/4, 73, 80 R, 502

[56] References Cited

U.S. PATENT DOCUMENTS

| | | | |
|---|---|---|---|
| 3,126,891 | 3/1964 | Caputi | 402/4 |
| 3,351,064 | 11/1967 | Cohn | 402/4 |
| 4,075,702 | 2/1978 | Davies | 364/708 |
| 4,264,011 | 4/1981 | Dalbo et al. | 402/73 |
| 4,703,161 | 10/1987 | McLean | 235/1 D |
| 4,803,652 | 2/1989 | Maeser et al. | 364/708 |

FOREIGN PATENT DOCUMENTS

| | | | |
|---|---|---|---|
| 2739157 | 3/1979 | Fed. Rep. of Germany | 364/708 |
| 2368091 | 6/1978 | France | 364/705.01 |
| 60-63665 | 4/1985 | Japan | 364/709.12 |

*Primary Examiner*—Gary V. Harkcom
*Assistant Examiner*—Long T. Nguyen

[57] ABSTRACT

A portable computer unit contained within a substantially planar housing a minimal thickness designed for transport in a ring-type notebook binder. Specifically, the housing includes an upper section having a plurality of openings which are sized to receive the binder rings. Once the binder rings are inserted within the openings of the housing, the entire computer unit may be easily transported within the binder. Transport in this manner also obscures the computer from view, diminishing the possibility of theft.

13 Claims, 1 Drawing Sheet

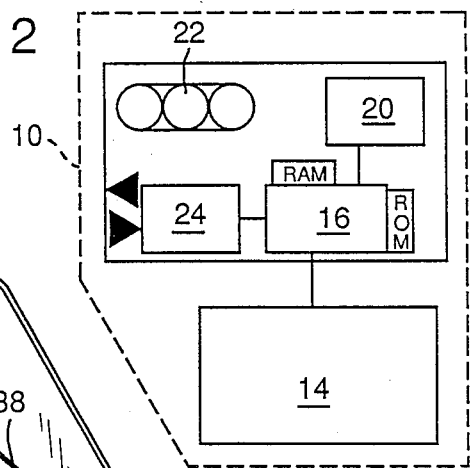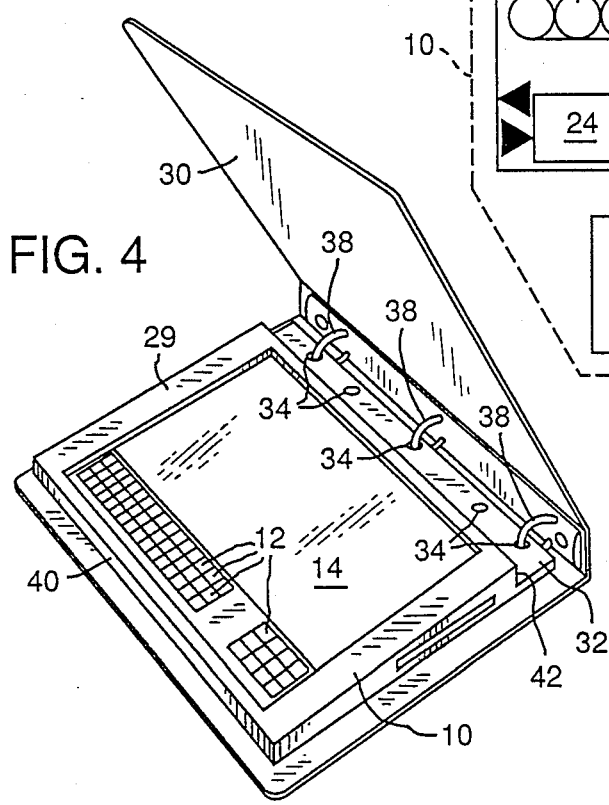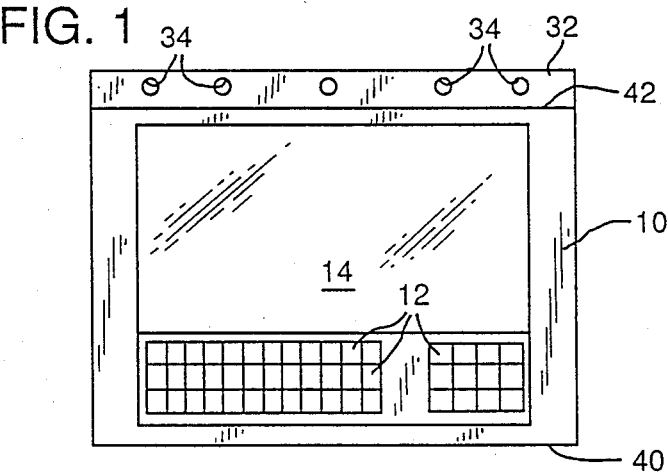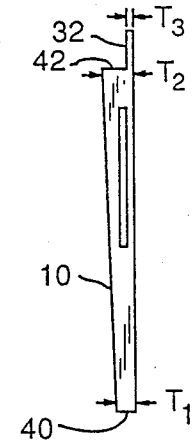

NOTEBOOK MOUNTABLE COMPUTER SYSTEM

This invention generally relates to computer systems, and more particularly to portable computer systems designed to be transported in an efficient, safe, and convenient manner.

BACKGROUND OF THE INVENTION

In recent years, demand has progressively increased for small, powerful computer systems which are easily transported. To satisfy this demand, nearly all computer companies have developed portable computers designed for desk and lap-top use. Desk units typically involve a plurality of separate components in electrical communication with each other, including monitors, keyboards, disk drives and other peripherals known in the art. Lap-top computers are essentially self-contained in that they typically include a keyboard, a display (either liquid crystal (LCD) or gas plasma panel), disk drives, and other components housed in a single unit.

Notwithstanding the development of desk and lap-top computers, a demand still exists for full-feature computers of increased portability. The present invention represents a substantial advance in the development of portable computers. The invention as described herein is especially designed for the scientist, educator or business person who requires a computer which is extremely easy to transport in a safe and secure manner.

SUMMARY OF THE INVENTION

It is an object of the present invention to provide a computer system which is versatile, powerful, and of minimal size.

It is another object of the invention to provide a computer system which is easily and conveniently transported in a manner not heretofore known in the art.

In accordance with the foregoing objects, the present invention involves a portable computer contained within a substantially flat housing adapted to be transported in a ring-type notebook binder. The housing includes an upper longitudinal portion having a plurality of openings which are sized to receive the binder rings. Spacing of the openings from each other may be varied in accordance with differing binder configurations. Once the binder rings are inserted within the openings of the housing, the entire computer may be easily and conveniently transported within the binder. In addition, transport in this manner obscures the computer from view, diminishing the possibility of theft.

These and other objects, features, and advantages of the invention will be described below in the following brief description of the drawings and detailed description of a preferred embodiment.

BRIEF DESCRIPTION OF THE DRAWINGS

FIG. 1 is a top view of a portable computer produced in accordance with the invention.

FIG. 2 is a schematic interior view of the computer of FIG. 1 showing the basic components contained therein.

FIG. 3 is a side view of the computer of FIG. 1.

FIG. 4 is a perspective view of the computer of FIG. 1 shown secured within a conventional ring-type notebook binder.

DETAILED DESCRIPTION OF A PREFERRED EMBODIMENT

In accordance with the present invention, a computer system of improved design is described herein. It is especially well-suited for the educator, scientist, or business person who needs a computer available at all times. Furthermore, it is also designed to be transported in a manner which discourages theft.

With respect to FIG. 1, a portable computer unit is illustrated which includes a housing 10 of minimal thickness constructed of impact-resistant plastic or other durable material known in the art. The housing 10 is designed to contain the operating components of the computer, which may take a variety of different forms.

As far as basic structural components are concerned, the computer of FIG. 1 will include a keyboard 12, and a display 14. The display 14 is preferably of the flat electronic panel variety (LCD or gas plasma) which may optionally by touch-sensitive. If a touch-sensitive display is used, it could be designed to include a keyboard configuration built into the display panel. Within the housing 10, a microprocessor unit 16 known in the art having an adequate supply of RAM (e.g. 640K) and ROM is provided, along with an optional disk drive 20 and rechargeable battery unit 22 (FIG. 2). An optional interface unit 24 known in the art could also be provided.

Preferably, the computer would have appointment/information management capabilities, the ability to access databases, and the ability to store information including telephone numbers. It would also have word processor/calculator capabilities.

The housing 10 has a width and overall dimensions specifically designed for placement within a standard ring-type binder 30 shown in FIG. 4. While these binders may have variable dimensions, including differing degrees of thickness, they normally have a length of approximately 10-13 inches, and a width of approximately 8-11 inches. Furthermore, typical binders having these dimensions usually include three selectively openable metal rings, each being spaced from each other by approximately 4 inches. In accordance with these dimensions, a preferred version of the housing 10 would be about 9-12 inches long and about 7-10 inches wide.

As shown in FIG. 4, the housing 10 is designed to be stored directly within the binder 30. To accomplish this, this housing 10 includes a lower section 29 containing most of the operating components of the computer, and an upper section 32 having a plurality of openings 34 which are sized to receive the rings 38 of the binder 30. Again, the openings 34 may be variably spaced from each other in order to accommodate notebook binders having a different degree of ring spacing.

As shown in FIG. 3, the thickness $T_1$, at outer edge 40 of the housing 10 is preferably less than the thickness $T_2$ at the inner edge 42. The housing 10 preferably increases in thickness progressively from $T_1$ to $T_2$ so that the display 14 is angled upwardly and easier to read. In a preferred embodiment $T_1$ is about 1-2 inches, with $T_2 = T_1 + \frac{1}{2}$ inch. Also, the upper section 32 has a thickness $T_3$ less than the thickness of the other portions of the housing 10 ($T_1$ and $T_2$). For example, if $T_1 = 2$ inches and $T_2 = 2\frac{1}{2}$ inches, $T_3$ would equal about $\frac{1}{2}$ inch. This design facilitates placement of the entire unit in the binder 30 along with other items including papers, documents, research reports, and the like.

By enabling the computer of the present invention to be transported directly within a notebook binder as shown and described herein, it becomes increasingly portable in comparison with other, currently available micro-computers. Also, storage of the unit within a binder obscures it from view during transport, thereby diminishing the probability of theft.

A specific computer unit incorporating the foregoing features will be presented in the following Example section. While the Example offers specific information involving internal components and the like, it is not intended to be limiting. In fact, a variety of different internal components and other structural features may be selected in accordance with the invention, depending on the ultimate use for which the computer is intended.

EXAMPLE

The computer of the present invention could include the basic structural components and features of the portable lap-top computers currently manufactured by the Hewlett-Packard Component under the "Vectra" name. This would include a 96-key keyboard having a separate numbered key pad and a 7.16 MHz NEC V30 microcompressor with a CPU speed of 0.82. Also included would be a 640K byte RAM, and LCD display, a 25 pin parallel port, a 3.5 inch 1.44M byte floppy disk drive, and an optional 1200 bps internal modem. In addition, the system could include components designed to receive and transmit infrared data signals. Finally, an internal nickel cadmium battery would be provided.

With the entire computer weighing about 12 pounds, the housing would be approximately 10 inches long and 8 inches wide. Thicknesses $T_1$, $T_2$ and $T_3$ would be about 2, $2\frac{1}{2}$, and $\frac{1}{2}$ inches, respectively. Three openings would be provided along the upper section of the housing spaced from each other by approximately four inches in order to accommodate a standard 3-ring notebook binder. A unit constructed incorporating these features would be powerful and versatile, yet easily transported in a safe and convenient manner.

Having herein described a preferred embodiment of the invention, it is anticipated that suitable modifications may be made thereto by those skilled in the art. For example, the internal operating components of the computer, as well as its physical dimensions may be suitably varied within the scope of the invention. Thus, the invention is only to be construed in accordance with the following claims:

What is claimed is:

1. A portable computer system comprising:
   microprocessor means for receiving, storing, and processing data;
   display means for enabling said microprocessor means to produce a readily observable, visual output of information;
   input means for providing data to said microprocessor means; and
   a housing for containing said microprocessor means, display means, and input means, said housing further comprising attachment means for securing said housing to a notebook binder having rings therein so that said computer system may be retained in said notebook binder, said attachment means comprising a plurality of openings through said housing sized to receive said rings of said binder, said housing further comprising a lower section and an upper section, said upper section comprising said openings for the receipt of said rings of said binder, said lower section containing said display means and said input means therein, said upper section having a thickness less than that of said lower section.

2. The system of claim 1 wherein said display means comprises a flat electronic display panel.

3. The system of claim 2 wherein said flat electronic display panel is selected from the group consisting of a liquid crystal panel and a gas plasma panel.

4. The system of claim 1 wherein said input means comprises a keyboard.

5. The system of claim 1 wherein said lower section of said housing comprises a first longitudinal edge, and a second longitudinal edge, said second longitudinal edge being adjacent said upper section, the thickness of said lower section increasing progressively from said first longitudinal edge to said second longitudinal edge.

6. A portable computer system comprising:
   microprocessor means for receiving, storing, and processing data;
   display means for enabling said microprocessor means to produce a readily observable, visual output of information, said display means comprising a flat electronic display panel selected from the group consisting of a liquid crystal panel and a gas plasma panel;
   input means for providing data to said microprocessor means; and
   a housing for retaining said microprocessor means, display means, and input means, said housing comprising a lower section, and an upper section, said upper section having a thickness less than that of said lower section, said upper section further comprising attachment means for securing said housing to a notebook binder having rings therein, said attachment means comprising a plurality of openings sized to receive said rings of said binder so that said computer system may be retained therein, said lower section further comprising a first longitudinal edge, and a second longitudinal edge, said second longitudinal edge being adjacent said upper section, the thickness of said lower section increasing progressively from said first longitudinal edge to said second longitudinal edge.

7. The system of claim 6 wherein said input means comprises a keyboard.

8. A portable information system comprising:
   a notebook binder comprising a plurality of rings therein, said rings being readily opened and closed; and
   a portable computer unit sized for receipt within said binder, said computer unit comprising microprocessor means for receiving, storing and processing data, display means for enabling said microprocessor means to produce a readily observable, visual display of information, input means for providing data to said microprocessor means, and a housing for containing said microprocessor means, display means and input means, said housing comprising a plurality of openings therethrough sized to receive said rings of said binder, said housing further comprising a lower section and an upper section, said upper section comprising said openings for the receipt of said rings of said binder, said lower section containing said display means and said input means therein, said upper section having a thickness less than that of said lower section.

9. The system of claim 8 wherein said display means comprises a flat electronic display panel.

10. The system of claim 9 wherein said flat electronic display panel is selected from the group consisting of a liquid crystal panel and a gas plasma panel.

11. The system of claim 8 wherein said input means comprises a keyboard.

12. The system of claim 8 wherein said lower section of said housing comprises a first longitudinal edge, and a second longitudinal edge, said second longitudinal edge being adjacent said upper section, the thickness of said lower section increasing progressively from said first longitudinal edge to said second longitudinal edge.

13. A method for storing and transporting a portable computer within a notebook binder having a plurality of rings therein, said rings being readily opened and closed, said method comprising the steps of:

providing a computer unit having a microprocessor, a visual display, input means for providing data to said microprocessor, and a housing, said housing comprising a plurality of openings therethrough, said housing further comprising a lower section and an upper section, said upper section comprising said openings, said lower section containing said display means and said input means therein, said upper section having a thickness less than that of said lower section;

opening said rings of said binder;

aligning said rings of said binder with said openings in said housing;

inserting said rings of said binder within said openings in said housing; and closing said rings after insertion through said openings in said housing in order to store said computer within said binder.

* * * * *